UNITED STATES PATENT OFFICE.

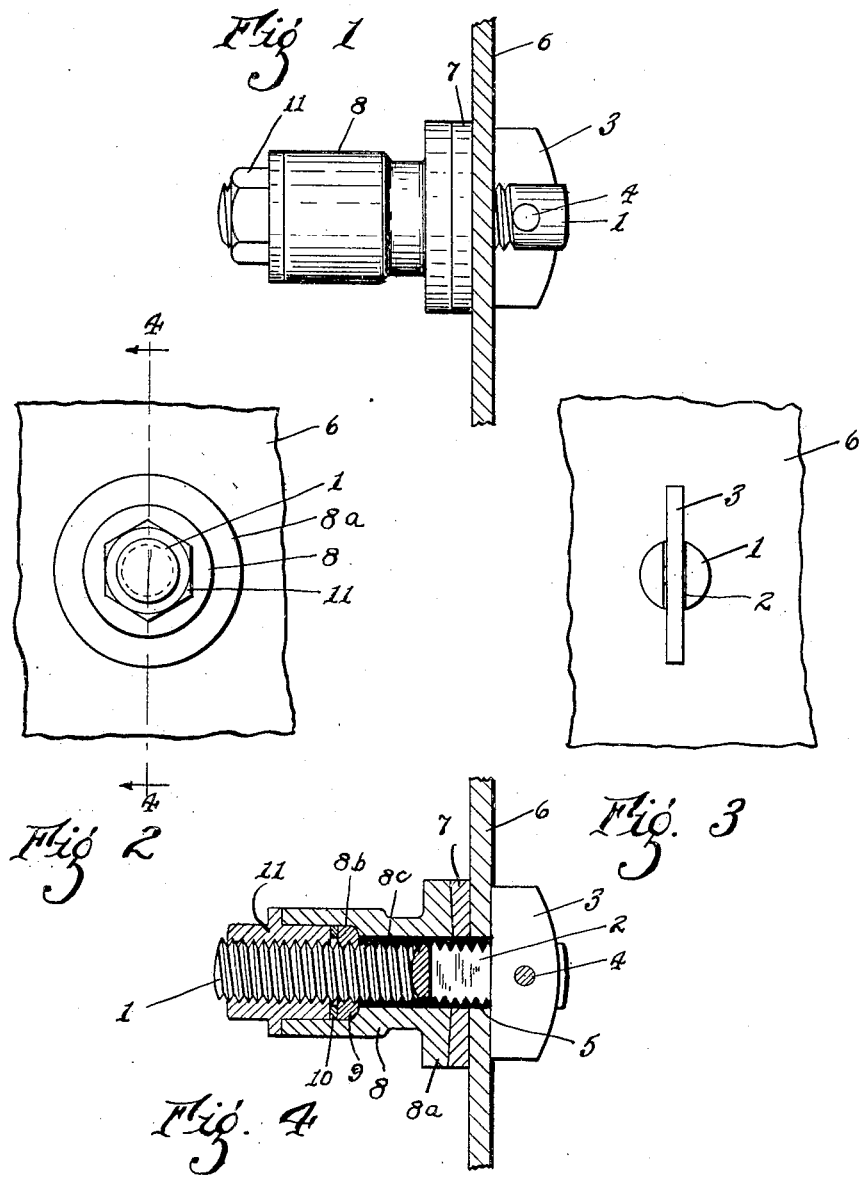

JAMES BROPSON, OF CLEVELAND, OHIO.

REPAIR-PLUG.

1,350,489.  Specification of Letters Patent.  Patented Aug. 24, 1920.

Application filed December 29, 1919. Serial No. 348,084.

*To all whom it may concern:*

Be it known that I, JAMES BROPSON, a citizen of the United States, residing at Cleveland, in the county of Cuyahoga and State of Ohio, have invented certain new and useful Improvements in Repair-Plugs, of which the following is a specification.

This invention relates to a new and improved device used for repairing leaks in boilers, tanks and similar articles of manufacture in which access to the interior is not to be had.

The particular object of the invention is to provide a simple and efficient device so constructed as to positively seal the opening and in such a manner as to prevent the reoccurrence of further leakage.

Further objects are in the provision of a bolt having a head so constructed as to enable it to be inserted through an aperture in the boiler and but slightly larger than the diameter of the bolt and its removal thereafter prevented; the provision of means for sealing the repair which will be unaffected by corrosion; of means which will permit no possibility of a blow-out due to excessive interior pressure and the provision of a device which will not become loose due to exterior strains or vibrations.

The foregoing objects are obtained in the embodiment of the invention shown in the annexed drawings wherein like reference numerals designate similar parts of reference throughout the various views and wherein Figure 1 is a side elevation of a bolt constructed in accordance with the principles above set forth; Fig. 2 is an elevation as viewed from the left of Fig. 1; Fig. 3 is an elevation as viewed from the right of Fig. 1 and Fig. 4 is an elevation partly in section taken on the line 4—4 of Fig. 2.

Referring to the drawings I have shown a bolt 1 slotted longitudinally at 2 to receive a key 3 pivotally mounted upon a pin 4 which passes through the bolt and is securely fastened thereto. The key 3 prevents the bolt from being drawn back through the aperture 5 in the boiler plate 6. A rubber washer 7 surrounding the bolt is held tightly against the boiler plate 6 by means of a tubular fitting 8 whose inner end terminates in a slightly cone shaped flange $8^a$. The opposite end of this fitting is shaped to form a cup $8^b$ which receives a rubber washer 9. A second washer 10 preferably of metal lays against the washer 9 preventing the latter from being cut by the action of the nut 11 when it is screwed upon the bolt 1. The bolt is inserted through the opening by turning the key to parallelism with the bolt, and the key then swings out to hold the bolt against withdrawal.

It will thus be seen that when the nut 11 is screwed up tightly the washer 9 effectively seals any leakage through the aperture $8^c$ of the fitting 8 and leakage between the face of the flange $8^a$ and the boiler plate 6 is sealed by the washer 7.

While I have shown my invention as a patch bolt it is also quite evident that it may be applied as a key bolt in all its uses, and therefore I do not wish to limit myself in the construction of the same further than is required by the state of the art or that which comes within the scope of the appended claim.

I claim:

A repair plug comprising a bolt adapted to be inserted through a hole and provided with means at its inner end to prevent withdrawal from the hole, a tubular fitting inclosing the outer part of the bolt, said fitting having a cup at its outer end, a nut screwed on the outer end of the bolt and into said cup, packing under the inner end of the fitting and packing under the nut, in the cup.

In testimony whereof, I do affix my signature in presence of two witnesses.

JAMES BROPSON.

Witnesses:
JOHN A. BOMMHARDT,
EUGENE A. CANNING.